P. K. ALDRICH.
BOLSTER SIDE BEARING.
APPLICATION FILED JULY 1, 1916. RENEWED NOV. 10, 1917.
1,260,993.
Patented Mar. 26, 1918.
2 SHEETS—SHEET 1.
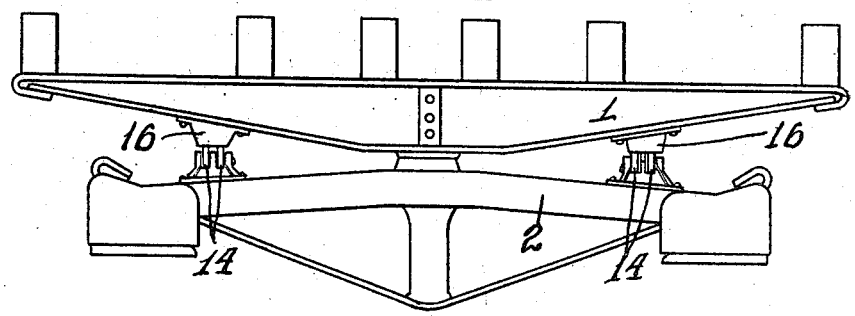
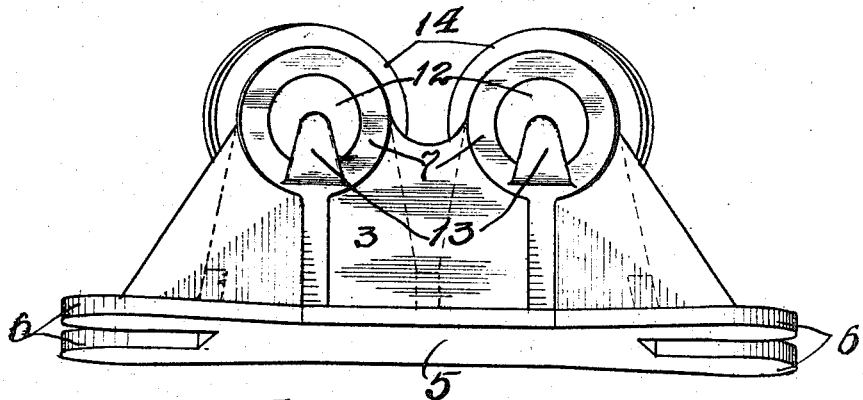
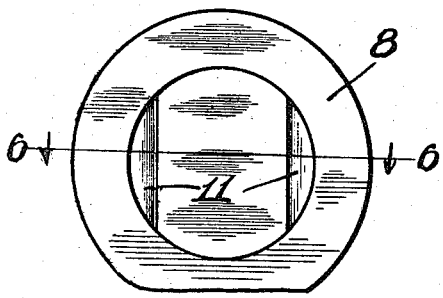
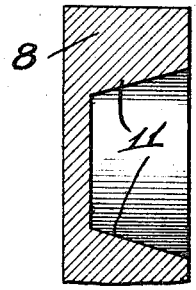
Witnesses
Inventor
Paul K. Aldrich

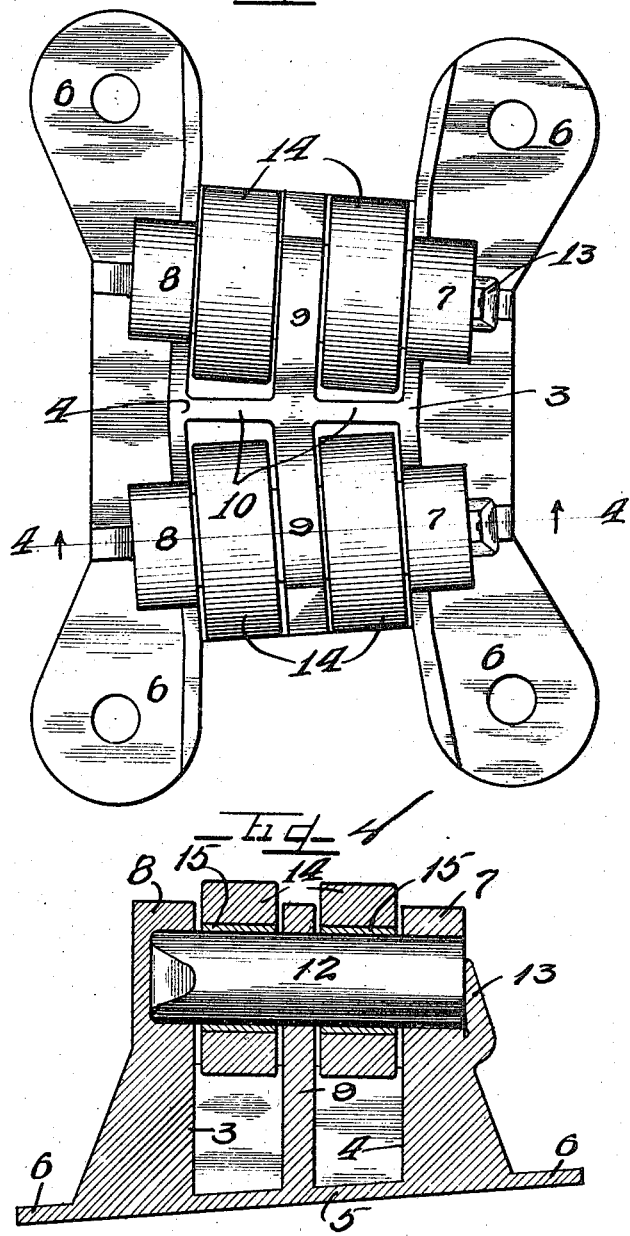

UNITED STATES PATENT OFFICE.

PAUL K. ALDRICH, OF CHICAGO, ILLINOIS, ASSIGNOR, BY MESNE ASSIGNMENTS, TO ALLEN McKENZIE, OF CHICAGO, ILLINOIS.

BOLSTER SIDE BEARING.

1,260,993.     Specification of Letters Patent.     Patented Mar. 26, 1918.

Application filed July 1, 1916, Serial No. 107,070. Renewed November 10, 1917. Serial No. 201,409.

*To all whom it may concern:*

Be it known that I, PAUL K. ALDRICH, a citizen of the United States, and a resident of the city of Chicago, in the county of Cook and State of Illinois, have invented certain new and useful Improvements in Bolster Side Bearings; and I do hereby declare that the following is a full, clear, and exact description of the same, reference being had to the accompanying drawings, and to the numerals of reference marked thereon, which form a part of this specification.

This invention relates to an improved type of bolster side bearings wherein the rollers are supported in angular relation radially disposed about the central pivot connection of the body and truck bolsters of the car and with the roller bearing base constructed to rigidly support the roller shafts or axles to prevent deflection thereof and cramping of the bearing under extreme load stresses.

It is an object therefore of this invention to construct a side bearing for car bolsters embracing a base formed to receive shafts mounted therein and provided with reinforcement webs dividing the base into a plurality of compartments one for each of the roller elements whereby the pivot of each roller is positively and efficiently supported, and cramping due to extreme loads acting to prevent perfect rolling action of the roller elements, is obviated.

It is also an object of this invention to construct side roller bearings comprising a base affording a plurality of compartments and with shaft sections mounted in angled relation through said compartments and held secured in said base to receive the roller elements journaled thereon, with one disposed in each of said compartments.

It is is furthermore an important object of this invention to construct a side roller bearing for car bolsters embracing a base member attachable upon the truck bolster, and having a plurality of rollers journaled therein radial about the central pivot connection of said bolsters one to another, and with each pair of rollers journaled on a common shaft which is positively supported at its ends and at its middle intermediate the rollers.

It is finally an object of this invention to construct an improved type of bolster side bearing of exceedingly substantial construction with the parts arranged and constructed to prevent cramping of the rollers under excessive load stresses.

The invention (in a preferred form) is illustrated in the drawings and hereinafter more fully described.

In the drawings:

Figure 1 is a central front elevation of a car body and truck bolster with side roller bearings embodying the principles of my invention associated therewith.

Fig. 2 is a side elevation of one of the roller bearings attachable on the truck bolster.

Fig. 3 is a top plan view of the roller bearing mechanism shown in Fig. 2.

Fig. 4 is a detail section taken on line 4—4 of Fig. 3.

Fig. 5 is a detail interior view of a receiving recess for one end of a roller shaft for the bearing base.

Fig. 6 is a detail section taken on line 6—6 of Fig. 5.

As shown in the drawings:

The reference numeral 1, indicates as a whole a car body bolster, and the reference numeral 2, a truck bolster on which the body bolster 1, is centrally pivoted in a well known manner. Bolted on each side of the truck bolster 2, on the outwardly downwardly inclined top surfaces thereof, are base castings each one comprising slightly angled longitudinal side walls 3 and 4, integrally joined to one another by a base plate 5, having attaching flanges 6, extending outwardly on each side therefrom. The bottom wall or base plate 5, of the casting, as clearly shown in Fig. 4, is inclined outwardly from the side wall 3, toward the side wall 4, to conform to the inclination of the top surface of the truck bolster 2. Formed integral with the respective side walls 3 and 4, are enlarged bosses 7 and 8, respectively, and also formed integral with said side walls and extending transversely therebetween is a central vertical partition wall 9, having longitudinally directed partition walls 10, extending from each side thereof in angled relation to one another and parallel to the slightly angled respective side walls 3 and 4. Each of the bosses 7, is provided with an aperture therethrough and each of the bosses 8, is recessed from the inner side, the top and bottom surfaces of the recesses in the bosses 8 being curved, and the side walls 11, tapered or convergent inwardly as shown in Figs. 5 and 6.

Inserted through each of the bosses 7, and seated in the cored out recesses in the respective bosses 8, are shaft sections or axle members 12, the inner ends of each of which seats in the recessed bosses 8, and is tapered to fit between the converging side wall portions 11, and thus maintain the shafts rigidly in position. For the purpose of retaining each of the shafts 12, secured in position in the respective base members, a tongue of metal 13, is formed on the base below each of the boss members 7, and as shown in Figs. 2 and 4, is adapted to be bent up against the end of the shaft to hold the shaft in position. Journaled within each of the four compartments of the base member formed by the respective walls 3, 4, and 10, are rollers or trunnions 14, each having a bearing bushing 15, which fits around the shaft 12, on which the rollers are journaled.

Secured on the under surfaces on each side of the body bolster 1, are frame castings 16, provided with the usual wear plates (not shown) which bear upon the top surfaces of the rollers 14.

The operation is as follows:

The bearing base members for the roller 14, are secured one on each side of the truck bolster 2, in the manner illustrated in Fig. 1, and the frame castings 16, are secured on the under surfaces on each side of the body bolster 1, in position to bear upon the rollers 14. The arrangement of the rollers 14, is substantially radial about the pivotal center of connection between the body bolster 1, and truck bolster 2, so that almost perfect rolling contact is assured at all times. Cramping of the roller elements when excessive loads are applied upon the side roller bearings is obviated due to the fact that the central support in the form of the partition wall 9, is provided for the respective shafts or axle sections 12, between the end supports therefor. Thus a free rolling movement of each of the rollers 14, in its respective compartment in the bearing base member is assured at all times.

Due to the convergency of each of the cored out recesses in the bosses 8, and the tapered end portion of the respective shafts 12, which interfit therewith, said shafts 12, are held rigidly in position to prevent rotation, and the tongue of metal 13, bent upwardly over the end of the shaft extending through the apertured boss 7, serves to retain the shaft securely in the base member.

I am aware that various details of construction may be varied through a wide range without departing from the principles of this invention and I therefore do not purpose limiting the patent granted otherwise than necessitated by the prior art.

I claim as my invention:

1. In a bolster bearing of the class described, a base member having partition walls formed at an angle with one another to divide the base member into a plurality of compartments, shafts secured in and mounted in angled relation through said compartments and rollers journaled on said shafts one roller disposed in each of said compartments.

2. In a device of the class described for attachment between pivotally connected bolsters, a base member, shafts secured rigidly in angled relation therein radial with respect to the pivot connection of said bolster, rollers journaled on said shafts, means preventing rotation of said shafts in said base member, and means integral with said base member contacting over the ends of each of said shafts to retain the same secured in said base member.

3. In a device of the class described for attachment between pivotally connected bolsters, a base member, shafts secured rigidly in angled relation therein radial with respect to the pivot connection of said bolsters, rollers journaled on said shafts, integral means formed in said base member preventing rotation of said shafts in said base member, and means supporting said shafts intermediate the ends thereof between a pair of rollers journaled thereon.

4. In a device of the class described the combination with body and truck bolsters pivotally connected together, of a side roller bearing comprising a base member, shafts secured rigidly therein in angled relation radial with respect to the pivotal connection between said body and truck bolsters, partition walls forming a part of the base member adapted to form a central support for said shafts intermediate the ends thereof, a radial partition wall integral with said partition walls, dividing said base member into a plurality of compartments, and rollers journaled on said shafts, one roller disposed in each of said compartments.

5. In a device of the class described, a base member, shafts mounted therein in angled relation, said base member having convergent recesses to receive one end of each of said shafts, each of said shafts tapered at one end to interfit with said convergent recesses, rollers journaled on said shafts, and means formed integral with the base member adapted to be clamped upwardly over the other end of each of said shafts to retain the respective shafts securely in said base member.

6. In a device of the class described, a base, shafts mounted therein, one end of each of said shafts tapered to interfit with a complementally shaped recess provided therefor in said base, rollers journaled on said shaft, a bearing support afforded by said base intermediate the ends of said shaft and intermediate a pair of rollers on the shaft, and means integral with the base adapted to be bent over the ends of said shafts to retain the same securely in said base.

In testimony whereof I have hereunto subscribed my name in the presence of two subscribing witnesses.

PAUL K. ALDRICH.

Witnesses:
CHARLES W. HILLS, Jr.,
EARL M. HARDINE.